(12) United States Patent
Kong (10) Patent No.: US 8,017,049 B2
(45) Date of Patent: Sep. 13, 2011

(54) APPARATUS AND METHOD FOR PRODUCING RESIN PRODUCT

(75) Inventor: Byung Seok Kong, Gunpo-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 12/635,586

(22) Filed: Dec. 10, 2009

(65) Prior Publication Data

US 2010/0090367 A1 Apr. 15, 2010

Related U.S. Application Data

(62) Division of application No. 12/336,397, filed on Dec. 16, 2008, now abandoned.

(30) Foreign Application Priority Data

Jun. 20, 2008 (KR) .......................... 10-2008-0058293

(51) Int. Cl.
*B29C 45/76* (2006.01)
*B29C 45/16* (2006.01)

(52) U.S. Cl. ...................... 264/40.1; 264/255

(58) Field of Classification Search .................. 264/242, 264/249, 250, 255, 318, 40.1; 425/110–112, 425/117, 120, 125, 127, 129.1, 130, 134, 425/149
See application file for complete search history.

(56) References Cited

U.S. PATENT DOCUMENTS

| | | | |
|---|---|---|---|
| 3,807,914 A * | 4/1974 | Paulson et al. ................. | 425/144 |
| 6,123,889 A * | 9/2000 | Katagiri et al. ................ | 264/255 |
| 6,312,633 B1 | 11/2001 | Kiesel et al. | |
| 7,108,825 B2 | 9/2006 | Dry et al. | |
| 2005/0082712 A1* | 4/2005 | Brodi et al. .................... | 264/138 |
| 2005/0183262 A1* | 8/2005 | Schoemann et al. ......... | 29/527.1 |

(Continued)

FOREIGN PATENT DOCUMENTS

EP 1 108 520 A1 6/2001

(Continued)

*Primary Examiner* — Joseph Del Sole
*Assistant Examiner* — Ryan Ochylski
(74) *Attorney, Agent, or Firm* — Morgan, Lewis & Bockius LLP (57) ABSTRACT

An apparatus produces a resin product which includes a first resin layer partially covered with a second resin layer so that a boundary line between the first and second resin layers is visible from the outside. The apparatus may include a first mold side having a recess, a second mold side configured and dimensioned to enclose the recess of the first mold side, a slide core movably fitted in the recess of the first mold side, which may be movable toward the second mold side to an extracted position to define a first cavity, and may be movable rearward to a retracted position after a first resin is injected into the first cavity to form the first resin layer, thus defining a second cavity into which a second resin is injected to form the second resin layer, the slide core including a dam dimensioned and configured to form a groove in the first resin layer during the formation of the first resin layer, wherein the dame partially positioned in the groove during the formation of the second resin layer, a first resin supply unit for supplying the first cavity with the first resin, and/or a second resin supply unit for supplying the second cavity with the second resin. The resin product produced by the apparatus is excellent in appearance, and obviates the post-processing formation of a tear line. Methods of forming the resin product are also described.

3 Claims, 9 Drawing Sheets

U.S. PATENT DOCUMENTS

| | | | |
|---|---|---|---|
| 2006/0226574 A1 * | 10/2006 | Bozio et al. | 264/248 |
| 2007/0057401 A1 * | 3/2007 | Dooley et al. | 264/161 |
| 2009/0043454 A1 | 2/2009 | Kong | |
| 2009/0127738 A1 | 5/2009 | Smith et al. | |
| 2010/0187722 A1 * | 7/2010 | Fiammengo | 264/255 |

FOREIGN PATENT DOCUMENTS

| | | |
|---|---|---|
| JP | 7-290500 A | 11/1995 |
| JP | 9-226413 A | 9/1997 |
| WO | WO 2005/068154 A1 | 7/2005 |
| WO | WO 2009019728 A1 * | 2/2009 |

* cited by examiner

FIG. 8

APPARATUS AND METHOD FOR PRODUCING RESIN PRODUCT

CROSS-REFERENCE TO RELATED APPLICATION

The present application is a divisional application of U.S. patent application Ser. No. 12/336,397, filed Dec. 16, 2008, which claims priority to Korean Application No. 10-2008-0058293 filed Jun. 20, 2008, the entire contents of which is incorporated herein for all purposes by this reference.

BACKGROUND OF THE INVENTION

1. Field of the Invention

The present invention relates to an apparatus and a method for producing a resin product which includes an inner layer and an outer layer, and, more particularly, to an apparatus and a method for producing a resin product in which part of an inner layer (a first resin layer) is covered with an outer layer (a second resin layer) so that a boundary line between the inner layer and the outer layer is visible from the outside.

2. Description of Related Art

Figure 1:
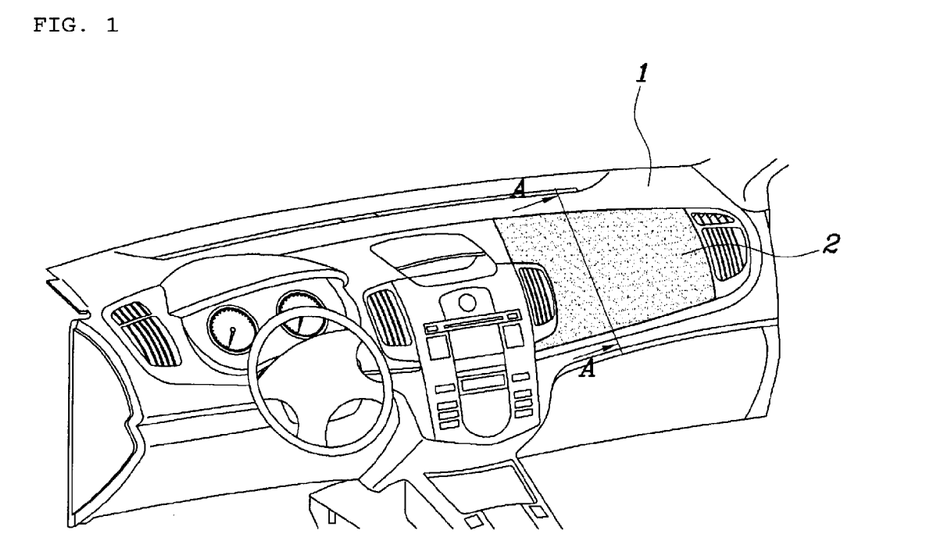
FIG. 1 is a perspective view showing a conventional crash pad.

Recently, various attempts are being made to improve the esthetic appearance and tactile impression of a resin product by covering a partial area of a surface of the resin product with an outer layer which is comprised of material different from that of the resin product. In an exemplary automotive crash pad, as shown in FIG. 1, an outer layer, which has a material (in particular, a soft material unlike that of the crash pad) and a color, different from that of the crash pad 1, is formed on a door region 2 of a passenger air bag ("PAB") so as to give off a feeling of sophistication.

Figure 2:
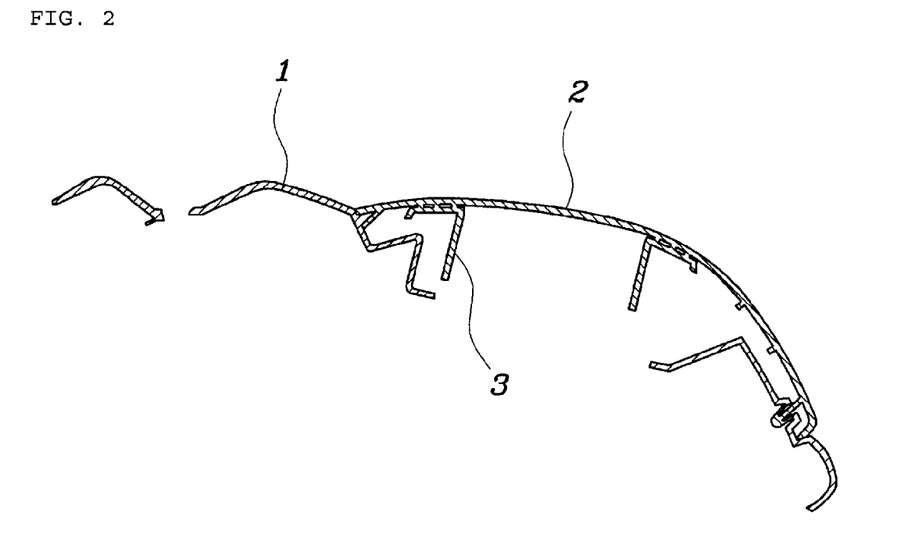
FIG. 2 is a cross-sectional view taken along line A-A of FIG. 1.

As shown in FIG. 2, such a conventional crash pad has been generally manufactured in a manner in which an outer component, which is separately produced in advance, is attached to the crash pad 1. These days, a recent technical development is to realize a PAB door region 2 which is integrally covered with an outer layer of material different from that of the PAB door at the time of the injection molding process of a crash pad. As compared with the former process which requires two different molds and processes of assembly of the outer component, the latter method is relatively advantageous in that it is excellent in terms of cost and the appearance of a fabricated crash pad, in particular, the boundary line of the PAB door region 2 is clean-cut and clearly demarcated.

Referring to FIGS. 3A to 3E, a process of producing a crash pad through the latter method will be described below.

An apparatus for producing the crash pad comprises a mold, and a first resin supply unit 10 and a second resin supply unit 20 for supplying resin material into an internal space in a mold. The mold comprises a first mold side having a recess 30, a second mold side, and a slide core movably fitted in the recess 30 of the first mold side. In such a crash pad, PPF resin (Polypropylene Filled Resin) such as talc-filled polypropylene resin is used as a first resin material, and flexible TPO resin (Thermoplastic Olefin Resin) is used as a second resin material.

Figure 3A:
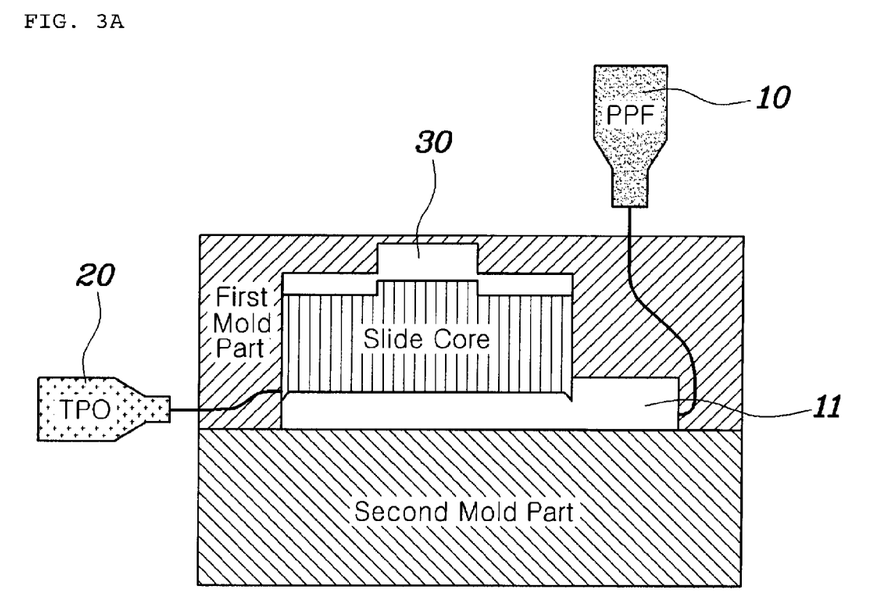
FIGS. 3A to 3E are cross-sectional views sequentially illustrating a conventional process of producing a crash pad.
Figure 3B:
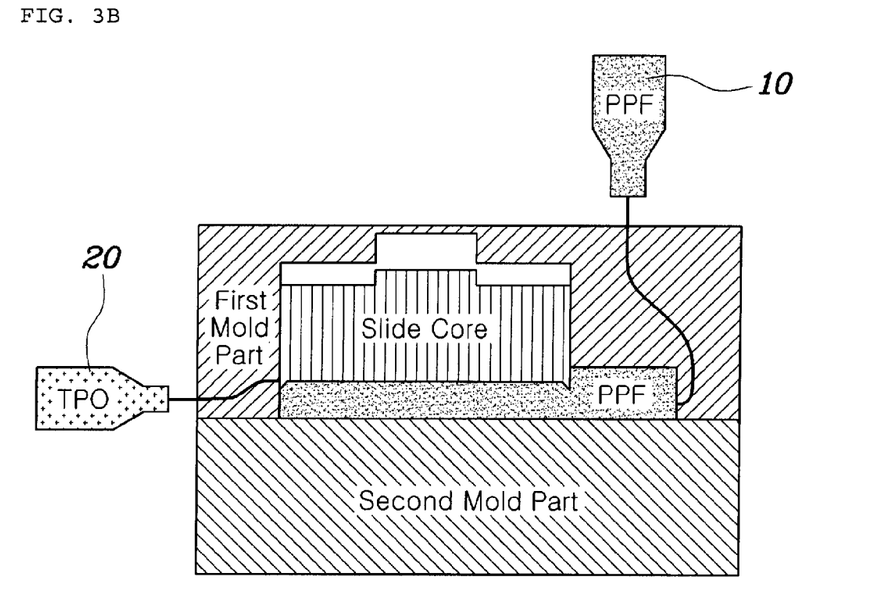
Figure 3C:
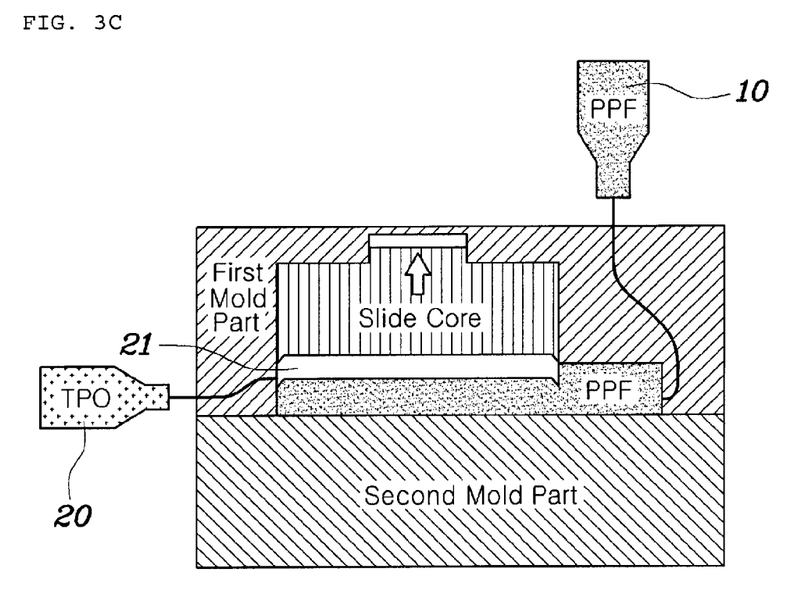
Figure 3D:
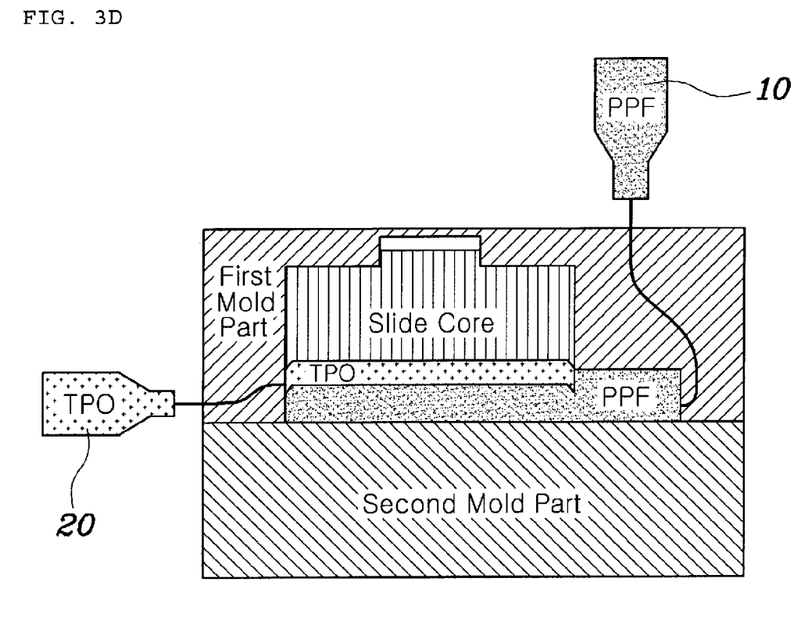
Figure 3E:
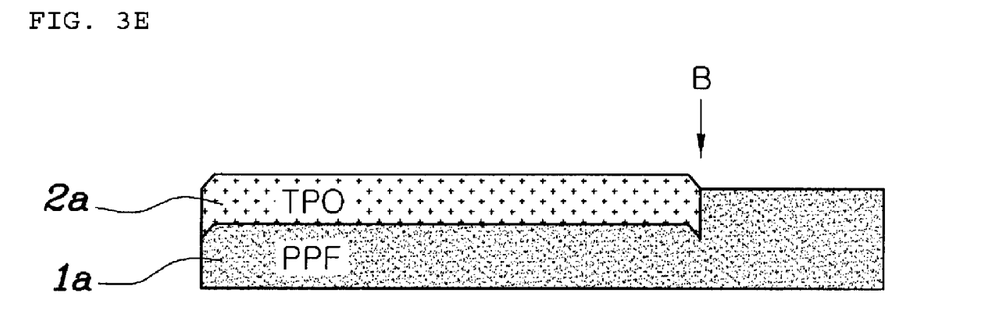

The process of producing the crash pad is conducted in a manner that the slide core is moved to the extracted position to define a first cavity 11 (FIG. 3A), the first resin is supplied into the first cavity 11 to form a first resin layer 1a (FIG. 3B), the slide core is moved to the retracted position to define a second cavity 21 (FIG. 3C), and prior to the solidification of the first resin, second resin is supplied into the second cavity 21 to form a second resin layer 2a on the first resin layer 1a (FIG. 3D). The resulting crash pad, which is produced in this manner, has a considerably well delimited boundary line B between the first and second resin layers 1a and 2a (FIG. 3E).

However, the above apparatus and method for producing a crash pad has the following disadvantages.

Figure 4:
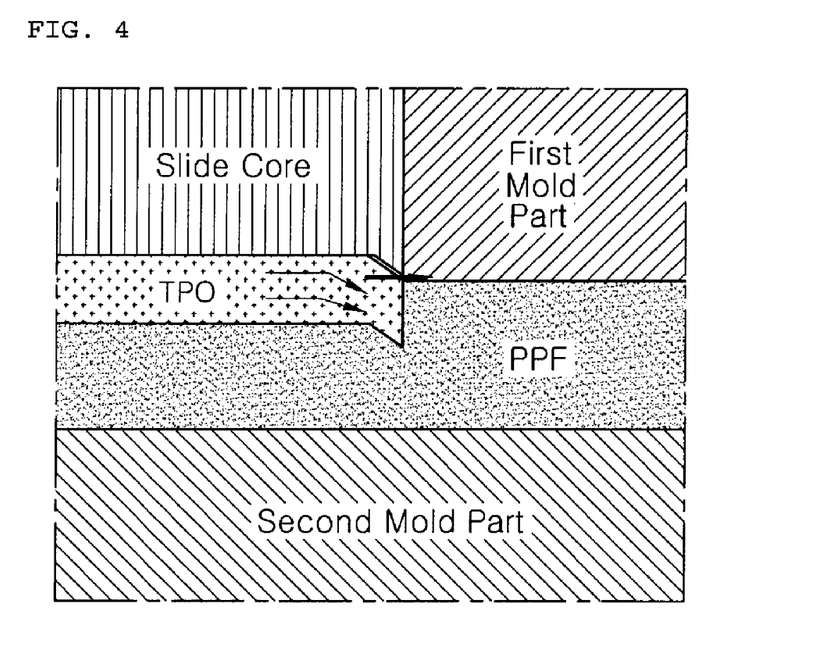
FIG. 4 is a cross-sectional view showing problems occurring at the boundary between first and second resin layers during a process of forming the second resin layer shown in FIG. 3D.

As shown in FIG. 4, since the second resin (PPF) is injected before the complete solidification of the first resin (TPO), there may be a gap between the first and second mold sides, so that the second resin leaks into the zone of the first resin through the gap, thus hindering the clean-cut appearance at the boundary line.

Figure 5:
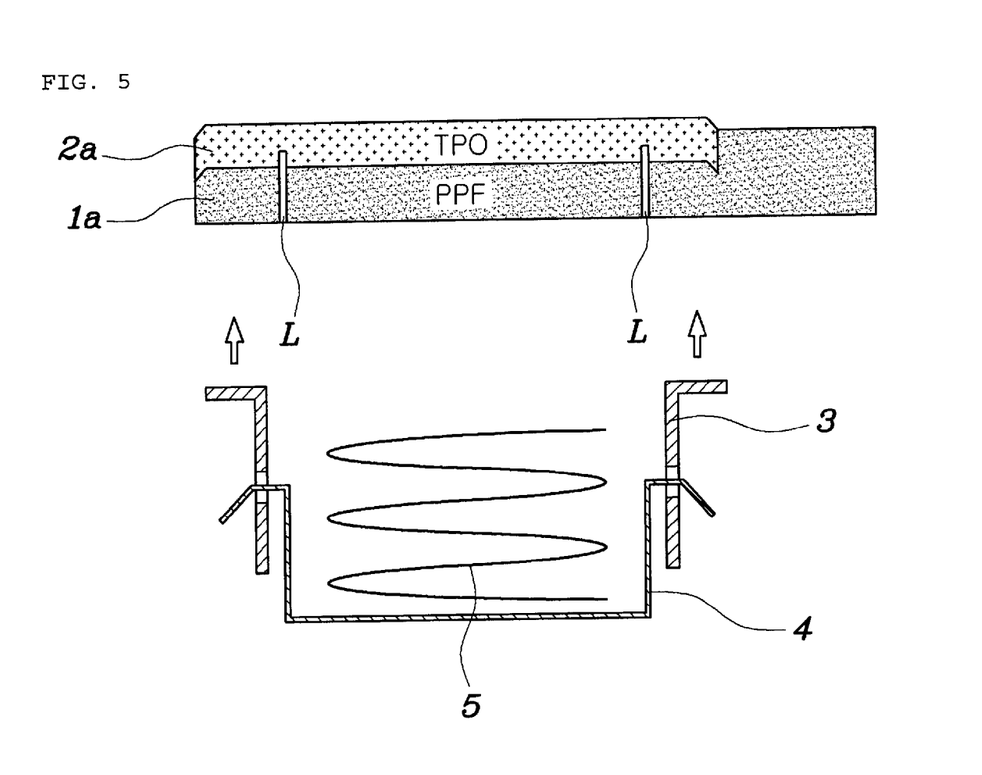
FIG. 5 is a cross-sectional view showing a tear line, which is formed in the crash pad produced through the process shown in FIG. 3A to 3E, using post-processing.

Furthermore, as shown in FIG. 5, the rear surface of the resulting crash pad is post-processed to produce a tear line L, and is attached to a chute 3 of an airbag module in a fusion manner. The chute 3 is assembled with a housing 4 which accommodates a folded cushion 5. Unfortunately, such a post-processing formation of the tear line L increases production costs of the crash pads, and a degree of freedom of the post-process is not so high. Furthermore, when the processing accuracy is lowered, there may be a fear that the breaking strength at the tear line L is excessively increased.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Accordingly, the present invention has been made keeping in mind the above problems occurring in the related art, and the present invention provides an apparatus and a method for producing a resin product in which a first resin layer is partially covered with a second resin layer and which has a very fine appearance at a tear line and obviates post-processing for the formation of the tear line.

Various aspects of the present invention are directed to an apparatus for producing a resin product which includes a first resin layer partially covered with a second resin layer so that a boundary line between the first and second resin layers is visible from the outside. The apparatus may include a first mold side having a recess, a second mold side configured and dimensioned to enclose the recess of the first mold side, a slide core movably fitted in the recess of the first mold side, which may be movable toward the second mold side to an extracted position to define a first cavity, and may be movable rearward to a retracted position after a first resin is injected into the first cavity to form the first resin layer, thus defining a second cavity into which a second resin is injected to form the second resin layer, the slide core including a dam dimensioned and configured to form a groove in the first resin layer during the formation of the first resin layer, wherein the dame partially positioned in the groove during the formation of the second resin layer, a first resin supply unit for supplying the first cavity with the first resin, and/or a second resin supply unit for supplying the second cavity with the second resin.

The recess may be a stepped structure including a first recess section and a second recess section having a greater depth than that of the first recess section, and the slide core may be positioned in the second recess section. The dam may be formed along a circumference of the slide core. The second mold side may include a wedge ridge for forming a tear line in the first resin layer. The slide core may include a pressure sensor for measuring a pressure of resin in a vicinity of the wedge ridge.

Another aspect of the present invention is directed to a method of producing a resin product which may include a first resin layer partially covered with a second resin layer so that a boundary line between the first and second resin layers is visible from the outside. The method may include closing a first mold side having a recess with a second mold side, moving a slide core fitted in the recess of the first mold side toward the second mold side to an extracted position to define a first cavity, the slide core including a dam to form a groove in the first resin layer, filling the first cavity with a first resin to form the first resin layer, moving the slide core to a retracted position, thus defining a second cavity while the dam may be partially disposed in the groove of the first resin layer, and/or filling the second cavity with a second resin to form the second resin layer.

The recess may be a stepped structure including a first recess section and a second recess section having a greater depth than the first recess section, and the slide core may be positioned in the second recess section, the method further comprising filling the first cavity with the first resin such that when the first cavity may be fully filled with the first resin, a region of the first resin layer corresponding to the second recess section has a thickness less than that of a remaining region of the first resin layer. The second mold side may include a wedge ridge forming a tear line in the first resin layer. The method may further include measuring a pressure of the second resin in a vicinity of the wedge ridge while filling the second cavity with the second resin, and controlling an injection pressure of the second resin so as to maintain the pressure of the second resin within a predetermined range.

Another aspect of the present invention is directed to a method of producing a resin product which includes a first resin layer partially covered with a second resin layer so that a boundary line between the first and second resin layers is visible from the outside. The method may include closing a first mold side having a recess with a second mold side, the second mold side including a wedge ridge for forming a tear line in the first resin layer, moving a slide core fitted in the recess of the first mold side toward the second mold side to an extracted position to define a first cavity, filling the first cavity with a first resin to form the first resin layer, moving the slide core to a retracted position to define a second cavity, and/or filling the second cavity with a second resin to form the second resin layer and measuring a pressure of the second resin in a vicinity of the wedge ridge, and controlling pressure of injection of the second resin so as to maintain the pressure of the second resin within a predetermined range.

The groove in the first resin layer has a thickness ranging from about 1 mm to about 2 mm. The groove in the first resin layer have a thickness ranging from about 1 mm to about 1.5 mm. The dam extends toward the second mold side along an outer circumference of the slide core with a predetermined height. The second mold side may include a wedge ridge, extending along on an upper surface thereof within the dam and toward the slide core, for forming a tear line in the first resin layer. The height of the wedge ridge may be smaller than thickness of the first resin layer.

The above-mentioned resin products may be a vehicle dashboard.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 6A:
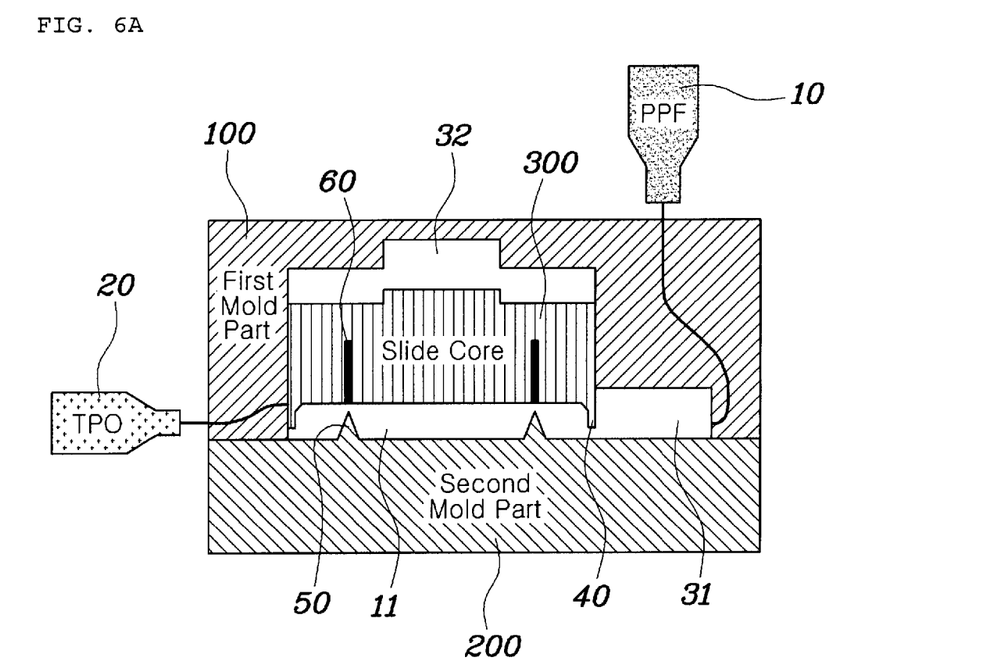
FIGS. 6A to 6E are cross-sectional views sequentially illustrating an exemplary process of producing a crash pad, according to an aspect of the present invention.
Figure 6B:
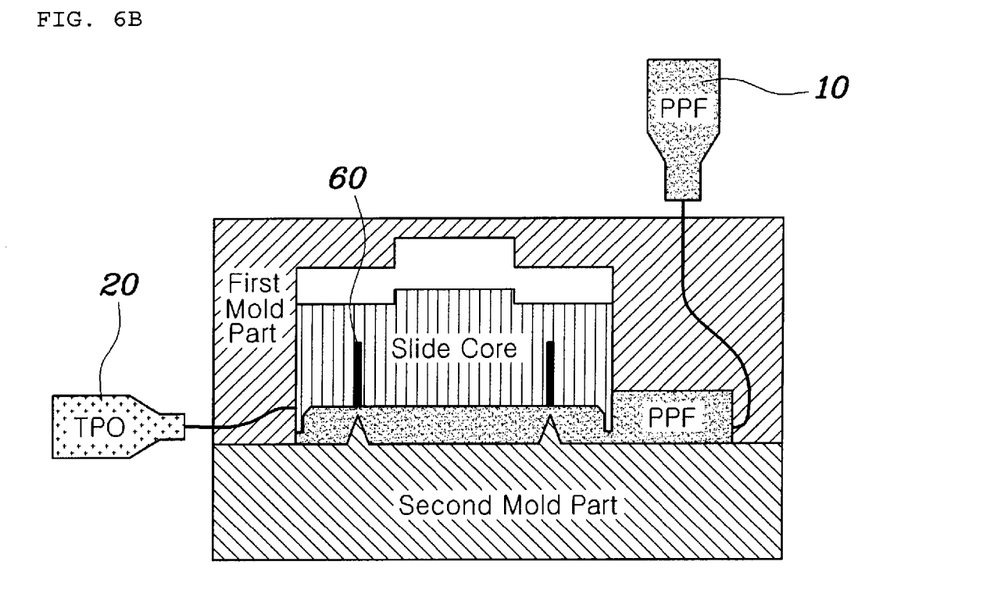

First, an apparatus for producing a crash pad, according to various aspects of the present invention is described with reference to FIGS. 6A and 6B. As also disclosed in the above description of the related art, the apparatus includes a mold, and a first resin supply unit 10 and a second resin supply unit 20, and the mold includes a first mold part or side 100, a second mold part or side 200, and a slide core 300.

The first mold side 100 has a recess, which is configured into a stepped structure including a first recess section 31 and a second recess section 32 having a depth deeper than the first recess section 31. In various embodiments, the first recess section 31 may be formed only at one side of the second recess section 32, as shown in FIGS. 6A to 6D, or may be formed at both right and left sides of the second recess section 32. In the latter case, the outer layer, that is the second resin layer, will have a shape isolated from the outside by the inner layer, that is, the first resin layer, like a fried egg.

The second mold side 200 is coupled with the first mold side 100 so as to form an enclosed space defined by the first recess section 31 and the second recess section 32. The upper surface of the second mold side 200, which faces the second recess section 32 of the first mold side 100, may be provided with a wedge ridge 50. The wedge ridge 50 is intended to form a tear line on the rear surface of the crash pad.

Figure 6C:
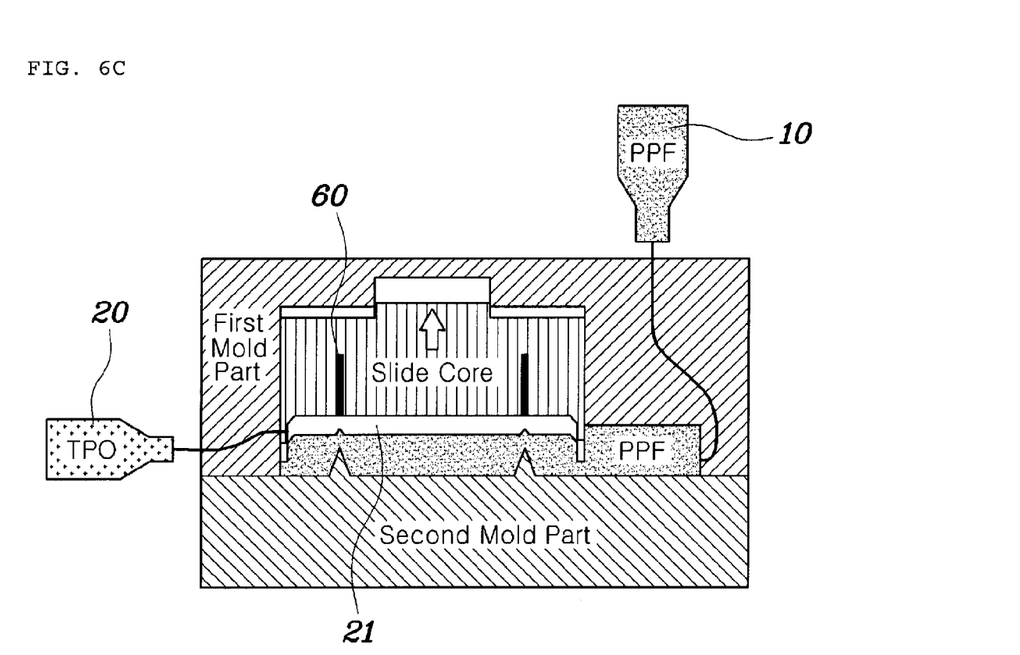

The slide core 300 is movably fitted in the second recess section 32. When the slide core 300 is moved toward the second mold side 200 in the extracted position with a predetermined distance, a first cavity 11 is defined between the first and second mold sides 100 and 200 (FIG. 6A). When the slide core 300 is moved toward the first mold side 100 to the retracted position after the first cavity 11 is filled with a first resin supplied by the first resin supply unit 10, a second cavity 21 is defined therebetween (FIG. 6C). The slide core 300 movably inserted into in the second recess section 32 of the first mold side 100 is provided at the front surface thereof (the surface facing the second mold side 200) with a dam 40 and a pressure sensor 60. The dam 40 protrudes along the outer circumference of the front surface of the slide core 300, and the pressure sensor 60 is incorporated at the area corresponding to the wedge ridge 50 formed on upper surface of the second mold side 200.

Figure 6D:
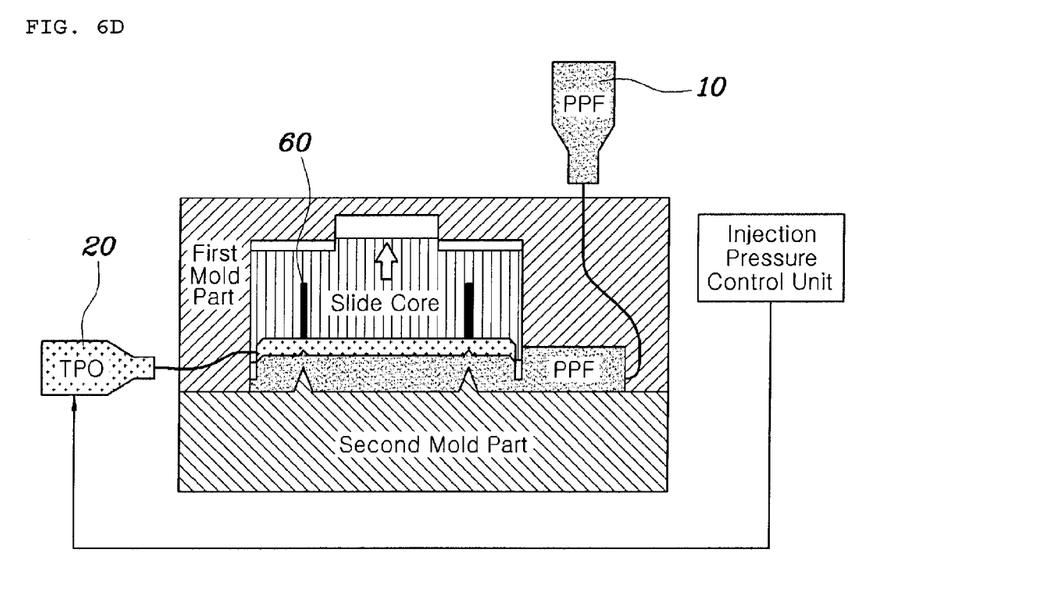

The first resin supply unit 10 is configured to supply the first cavity 11 with a first resin, for example, PPF resin, and the second resin supply unit 20 is configured to supply the second cavity 21 with a second resin, for example, TPO resin. As shown in FIG. 6D, the pressure of injection, by which the second resin is supplied from the second resin supply unit 20, is positively controlled by a control unit which will be described later.

Referring to FIGS. 6A to 8, the method of producing a crash pad, according to various aspects of the present invention is described.

Formation of the First Resin Layer

The first and second mold sides 100 and 200 are coupled together, and the slide core 300 is moved in the recess section of the first mold side 100, thus defining the first cavity 11 (FIG. 6A) and the second cavity 21 (FIG. 6C). The first cavity 11 is a space to form the first resin layer 10a and the second cavity 21 is a space to form the second resin layer 20a in which the moving distance of the slide core 300 is controlled such that the thickness of the second cavity is less than that of the first cavity.

When the first resin is injected into the first cavity 11 (FIG. 6B), the first cavity 11 is fully filled with the first resin, thus forming the first resin layer 10a in which a resin layer formed in the second cavity section 20a has a thickness less than that of a resin layer formed in the first cavity.

The first resin layer 10a is formed with a groove 10b (FIG. 6E) made by the dam 40 of the slide core 300. The groove 10b may have a thickness ranging from 1 mm to 2 mm, and preferably a thickness ranging from 1 mm to 1.5 mm. Furthermore, since the second mold side 200 includes the wedge ridge 50 protruding upwards therefrom, the first resin layer 10a is provided with a valley groove (L) at a region corresponding to the wedge ridge 50. In this regard, when the first resin is injected, a pressure of the first resin is locally increased at the region corresponding to the wedge ridge 50. When the movable slide core 300 is retracted toward the first mold side 100 before the solidification of the first resin, the locally increased pressure of the first resin causes the formation of a protrusion 10c (FIG. 6E) at the region corresponding to the wedge ridge 50.

Formation of the Second Resin Layer

Figure 7:
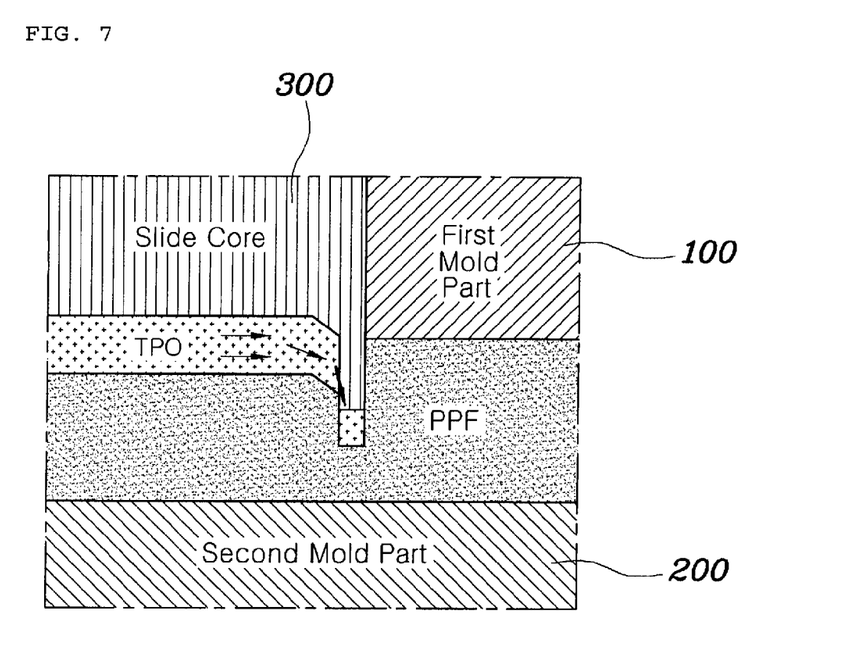
FIG. 7 is a cross-sectional view showing a cleanly demarcated boundary of the second resin layer formed by an exemplary process of forming the second resin layer shown in FIG. 6D.

Prior to the solidification of the first resin, the slide core 300 is retracted toward the first mold side 100 to define the second cavity 21 (FIG. 6C). At this time, the dam 40 of the slide core 300 partially remains disposed in the groove 10b (FIG. 7). When the second resin is injected into the second cavity 21, the second resin is blocked by the dam 40 and thus cannot leak into the first resin layer 10a. Even if a portion of the second resin leaks, the leaked portion of the second resin does not infiltrate between the first mold side 100 and the first resin layer 10a but instead is trapped in the groove 10b as shown in FIG. 7. When the thickness of the groove 10b is in a range of 1 mm to 2 mm, and preferably a range of 1 mm to 1.5 mm, the second resin in the groove 10b is almost invisible. Consequently, the boundary region between the first resin layer 10a and the second resin layer 20a has a remarkably clean appearance.

Figure 6E:
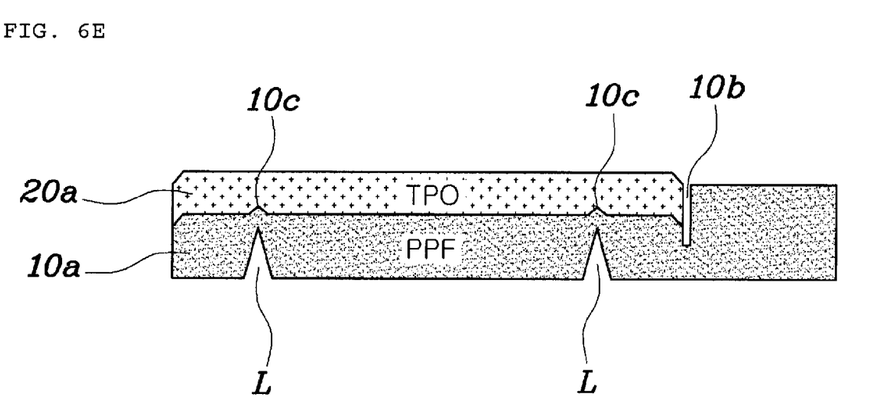
Figure 8:
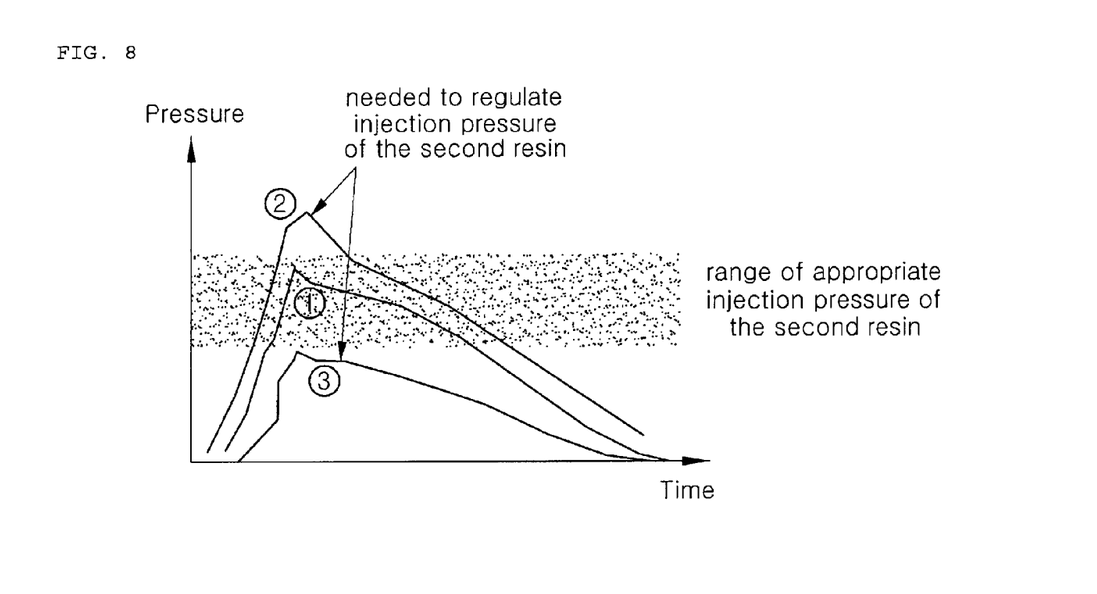
FIG. 8 is a graph showing an exemplary process of preventing formation of a protrusion on the second resin layer from being caused by a wedge ridge being formed on a first resin layer during the formation of the second resin layer.

As shown in FIG. 6E, the protrusion 10c of the first resin layer 10a, which is formed along the tear line, may also cause the formation of a protrusion on the second resin layer 20a during the injection of the second resin. The reason for this has been mentioned above. Accordingly, in order to prevent this formation of a protrusion on the second resin layer 20a, it is necessary to control the pressure of the second resin in the vicinity of the protrusion 10c. More specifically, as shown in FIGS. 6D to 8, the pressure of the second resin at the protrusion 10c is measured using the pressure sensor 60, and then the injection pressure control unit controls an injection pressure of the second resin supplied from the second resin supply unit 20, depending on the measured pressure value, such that the pressure of the second resin at the protrusion is maintained within a predetermined range. Referring to FIG. 8, when the pressure of the second resin measured by the pressure sensor is represented as curve 1, the present injection pressure of the second resin may be maintained as it is. When the pressure of the second resin is represented as curve 2, the injection pressure of the second resin needs to be decreased. Meanwhile, when the pressure of the second resin is represented as curve 3, the injection pressure of the second resin needs to be increased. The appropriate range of the injection pressure of the second resin may be acquired through repeated experiments. Of course, the height of the protrusion 10c may be properly controlled by controlling the pressure of the first resin at the wedge ridge 50 during the injection of the first resin.

As described above, the present invention provides an apparatus and a method for producing a resin product having an excellent appearance, and obviates post-processing formation of a tear line.

For convenience in explanation and accurate definition in the appended claims, the terms "upper" or "lower", "front" or "rear", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method of producing a resin product which includes a first resin layer partially covered with a second resin layer so that a boundary line between the first and second resin layers is visible from the outside, comprising:

closing a first mold side having a recess with a second mold side;

moving a slide core fitted in the recess of the first mold side toward the second mold side to an extracted position at a predetermined distance away from the second mold side to define a first cavity, the slide core including a dam to form a groove in the first resin layer;

filling the first cavity with a first resin to form the first resin layer;

moving only the slide core to a retracted position, thus defining a second cavity while the dam is partially disposed in the groove of the first resin layer; and filling the second cavity with a second resin to form the second resin layer and measuring a pressure of the second resin in a vicinity of a wedge ridge, and controlling pressure of injection of the second resin so as to maintain the pressure of the second resin within a predetermined range.

2. The method according to claim 1, wherein the recess is a stepped structure including a first recess section and a second recess section having a greater depth than the first recess section, and the slide core is positioned in the second recess section, the method further comprising filling the first cavity with the first resin such that when the first cavity is fully filled with the first resin, a region of the first resin layer corresponding to the second recess section has a thickness less than that of a remaining region of the first resin layer.

3. The method according to claim 1, wherein the second mold side includes the wedge ridge for forming a tear line in the first resin layer.

* * * * *